BENJAMIN I. WILLIAMS.
Coffee Roaster.

No. 125,241. Patented April 2, 1872.

125,241

UNITED STATES PATENT OFFICE.

BENJAMIN I. WILLIAMS, OF LANSING, MICHIGAN.

IMPROVEMENT IN COFFEE-ROASTERS.

Specification forming part of Letters Patent No. 125,241, dated April 2, 1872.

SPECIFICATION.

I, BENJAMIN I. WILLIAMS, of Lansing, in the county of Ingham and State of Michigan, have invented certain Improvements in Family Coffee-Roasters, of which the following is a specification containing a full, clear, and exact description of the construction and operation of the same, reference being had to the annexed drawing, making a part of this specification, and to the letters and figures of reference thereon marked.

Figure 1:
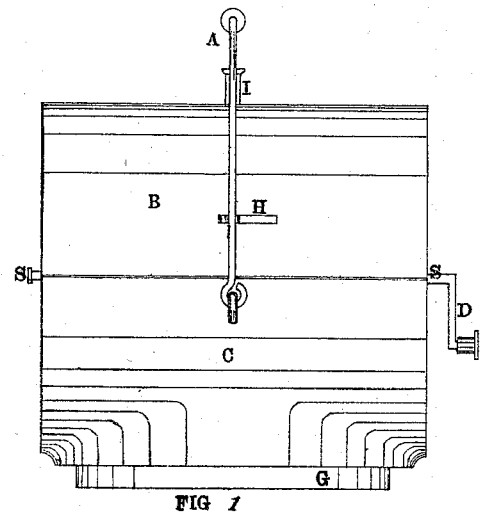
Figure 2:
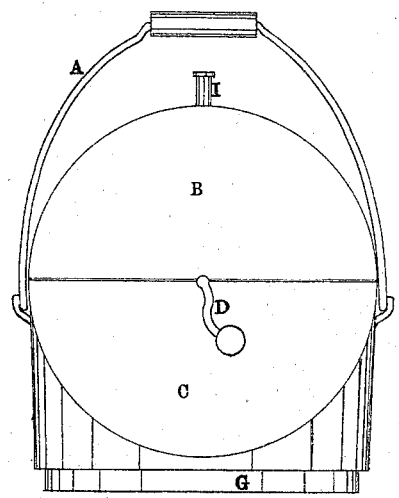
Figure 3:
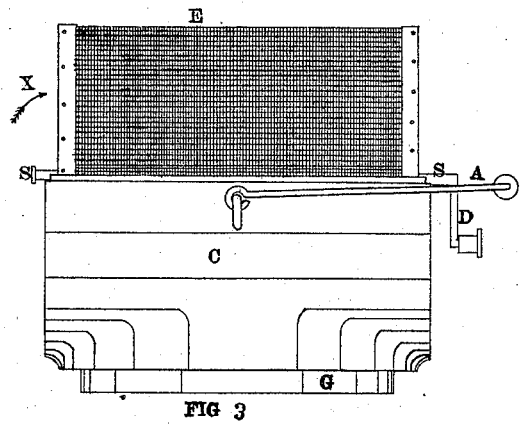
Figure 4:
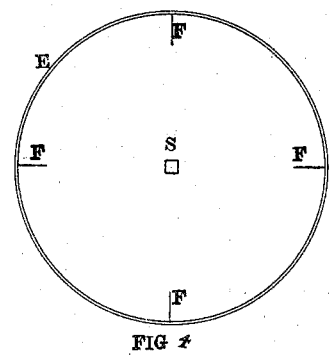

Figure 1 of the drawing is a representation of a side elevation of a machine embodying my invention. Fig. 2 is a representation of an end elevation of the same, showing that end which is at the right hand in Fig. 1. Fig. 3 is a representation similar to Fig. 1, with the bail A turned down and the top B removed, discovering the wire-cylinder E. Fig. 4 is a sectional end or transverse view of the wire-cylinder E.

Figure 5:
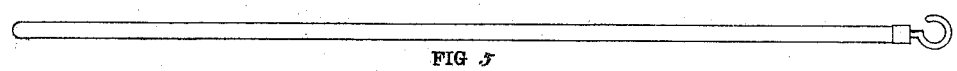

C is a cast-iron case, within which the wire-cylinder E revolves, and should be made with a bottom, G, like a common kettle, so that it may be set into the griddle-hole in a common cook-stove. B is a tin cover for C, and when it is placed over C, the two entirely inclose the cylinder E. E is a hollow cylinder to be made of wire-cloth, with tin or sheet-iron ends, and with four tin or sheet-iron wings projecting inward from the wire at equal distances from each other, as represented by F F F F, and running the entire length of the cylinder E. In the end of the cylinder E at X, there is an opening or aperture, with a door or slide to cover it, for the purpose of admitting the coffee into and removing it from the cylinder. This cylinder E rests and revolves upon the shaft S S, which passes entirely through it, with its ends resting upon the ends of C. D is a crank attached to the shaft S S, for the purpose of revolving the cylinder E. I is simply a knob or handle for raising and handling the tin cover B. A is a bail for lifting the entire machine. H is a spring attached to B, which holds the bail A in a perpendicular position when sprung into it. Fig. 5 is simply a rod with a hook at one end to attach it to the crank D, for the purpose of turning the cylinder E when the machine is being used upon a heated stove.

After placing the coffee in the cylinder E, by introducing it at the dart X, the cylinder, with its shaft S S and crank D, should be placed into C and covered with the tin cover B. Then the bail A, being raised into the spring H and the whole placed over a fire in the griddle-hole of a cook-stove, and the crank D being turned by the rod, Fig. 5, the coffee in the cylinder is kept well stirred by the evolution of the cylinder with its wings F F F F, and with a good fire in a very short space of time the coffee may be removed well and evenly roasted, and also with the dirt and chaff sifted from it into the bottom of C.

Claims.

I claim as my invention—

1. The combination of the iron case C, the cover B with its spring H, and the wire-cylinder E with its wings F F F F, its shaft S S, and crank D, substantially as and for the purpose hereinbefore set forth.

2. The combination of the wire-cylinder E with its wings F F F F, shaft S S, and crank D, and the tin cover B with the cast-iron case C, substantially as and for the purpose hereinbefore set forth.

BENJAMIN I. WILLIAMS.

Witnesses:
   O. V. FULLER.
   S. R. GREENE.